United States Patent [19]

Jennings

[11] Patent Number: 5,172,112

[45] Date of Patent: Dec. 15, 1992

[54] SUBSEA WELL PRESSURE MONITOR

[75] Inventor: Charles E. Jennings, Houston, Tex.

[73] Assignee: ABB Vetco Gray Inc., Houston, Tex.

[21] Appl. No.: 792,846

[22] Filed: Nov. 15, 1991

[51] Int. Cl.$^5$ ............................................. H04B 13/02
[52] U.S. Cl. ................................. 340/850; 340/854.6; 367/141; 166/337; 166/336
[58] Field of Search ............ 367/141; 340/850, 853.1, 340/854.6, 856.3, 856.4; 166/336, 337, 363, 364

[56] References Cited

U.S. PATENT DOCUMENTS

| | | | |
|---|---|---|---|
| 3,019,397 | 1/1962 | Witt et al. | 331/65 |
| 3,611,277 | 10/1971 | Yoder | 250/199 |
| 3,621,911 | 11/1971 | Baker et al. | 166/336 |
| 4,021,661 | 5/1977 | Levine | 250/199 |
| 4,147,222 | 4/1979 | Patten et al. | 166/364 |
| 4,167,215 | 9/1979 | Thorne | 166/337 |
| 4,826,577 | 5/1989 | Lange | 340/850 |

Primary Examiner—J. Woodrow Eldred
Attorney, Agent, or Firm—James E. Bradley

[57] ABSTRACT

A pressure measuring device will measure pressure in a subsea tubular member. The device includes a stationary unit mounted to the exterior of the tubular member and a movable unit that will be lowered into position next to the stationary unit whenever pressure is to be monitored. The stationary unit has a strain gage which will monitor pressure by measuring strain in the tubular member. The stationary unit has a light emitter which will emit pulses corresponding to pressure measured. The stationary unit has a photocell which will receive a light beam from the movable unit. The light beam and photocell provide power for the stationary unit. The movable unit has a receiver which receives any light pulses from the light emitter and correlates them to a pressure measurement.

14 Claims, 1 Drawing Sheet

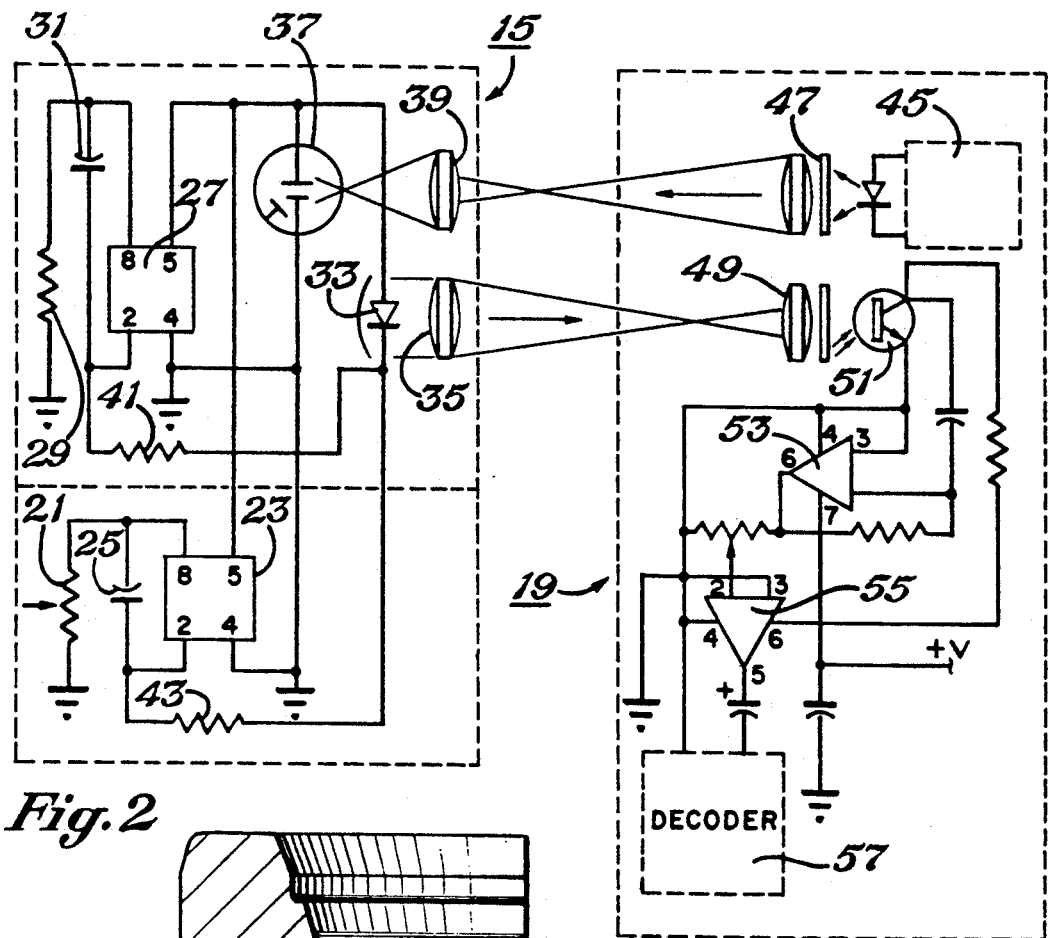
Fig.2
Fig.3
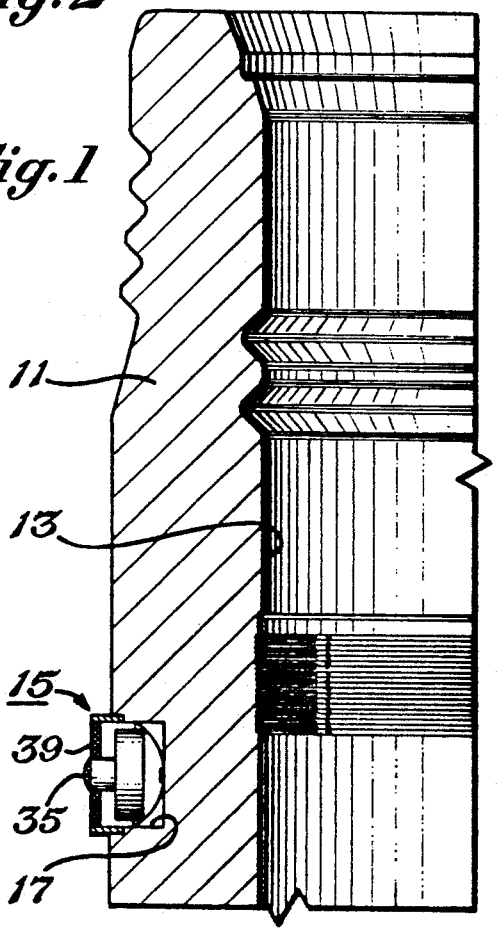
Fig.1

SUBSEA WELL PRESSURE MONITOR

BACKGROUND OF THE INVENTION

1. Field of the Invention

This invention relates in general to subsea well structures, and in particular to a method for remotely monitoring pressure in a subsea tubular member.

2. Description of the Prior Art

A need exists to periodically monitor the pressure in certain tubular members in subsea well installations. For example, in one type of subsea well, an outer wellhead housing will enclose an inner wellhead housing. The inner wellhead housing directly supports casing, tubing and the like which is subject to high pressure. The annulus surrounding the casing is normally not under any pressure. The annulus surrounding the casing communicates with the interior of the inner wellhead housing. In the event of leakage in this casing, the inner wellhead housing would be subjected to pressure.

Checking the pressure in the inner wellhead housing would indicate whether or not any casing leakage has occurred. In the prior art, this is not often done because installing a pressure sensor would require drilling a hole through the side wall of the inner wellhead housing. Wires would have to be provided to a surface platform. Because of the possibility of leakage, operators prefer to avoid drilling holes through the side wall of the wellhead housing. Also, an assembly of this nature requires maintaining electrical lines for the pressure sensor.

SUMMARY OF THE INVENTION

In this invention, the pressure is monitored by a stationary unit that mounts to the exterior of the tubular member, such as an inner wellhead housing, in which pressure is to be monitored. The sensor is preferably a strain gage that will monitor tensile strain in the tubular member that would occur if there was an increase in pressure.

The strain gage connects to an oscillator for varying the frequency of the oscillator depending upon the strain sensed by the strain gage. This variance is compared with a reference oscillator also mounted to the exterior of the wellhead housing. The difference between the reference frequency and the variable frequency corresponds to the pressure increase. This difference is applied to a light emitter, such as a light emitting diode for creating pulses.

Power for the stationary unit is supplied by a photocell mounted in the stationary unit. When pressure is to be monitored, a remote operated vehicle (ROV) will be lowered next to the wellhead housing. The ROV has a laser which will supply a beam of light to the photocell to power the components of the stationary unit. The light pulses emitted by the light emitter will be received by receiver mounted in the ROV. The receiver has a decoder, which preferably is a frequency counter for counting the pulses. This data can be recorded or transmitted to the surface over a data line of the ROV.

BRIEF DESCRIPTION OF THE DRAWINGS

FIG. 1 is a quarter sectional view of a subsea wellhead housing showing a stationary pressure monitoring unit mounted to the exterior of the wellhead housing.

FIG. 2 is a schematic view illustrating the circuitry of the stationary pressure monitoring unit of FIG. 1.

FIG. 3 is a schematic view of a movable unit mounted to an ROV (not shown) for use with the stationary unit of FIG. 2.

DETAILED DESCRIPTION OF THE INVENTION

Referring to FIG. 1, subsea inner wellhead housing 11 is a large tubular member mounted on the sea floor and extending partially into an outer wellhead housing (not shown). Wellhead housing 11 will house at least one casing hanger (not shown) once the well is completed. The casing hanger will be supported in the bore 13 of wellhead housing 11. Normally, there will be no pressure in the bore 13 as the pressure will be maintained within tubing and other structure contained in the wellhead housing 11. If pressure is found to exist in bore 13, normally a leak in the casing or casing hanger will have occurred.

A stationary unit 15 will be mounted to the exterior of wellhead housing 11 so that the pressure in bore 13 can be monitored from time to time. Stationary unit 15 is mounted in a recess 17 on the sidewall of wellhead housing 11. There will be no holes drilled through the sidewall of wellhead housing 11 to the bore 13. Rather, the monitoring of the pressure within bore 13 will be done entirely on the exterior of wellhead housing 11. Additionally, no wires or power source will connect stationary unit 15 to any surface platform.

A movable unit 19 (FIG. 3) will be periodically used to determine pressure in cooperation with the stationary unit 15. Movable unit 19 will be mounted to an ROV (remote operated vehicle) lowered from the surface usually on an umbilical line (not shown).

Stationary unit 15 monitors pressure by use of a strain gage 21, as shown in FIG. 2. Strain gage 2 is a conventional strain gage that will monitor tensile stress in metal structures, including tubular members. If sufficiently greater pressure exists in bore 13 than on the exterior of wellhead housing 11, stress will be imposed in wellhead housing 11, which will be sensed by strain gage 21.

Strain gage 21 is connected to a variable oscillator 23. Strain gage 21 operates as a variable resistor, which cooperates with a capacitor 25 to vary the oscillation frequency of the variable oscillator 23 depending upon the stress measured. Variable oscillator may be of various types, such as an LM 3909 LED (light emitting diode) flasher chip manufactured by National Semiconductor.

A reference oscillator 27 is also incorporated in stationary unit 15. Reference oscillator 27 is preferably of the same type as the variable oscillator 23. Reference oscillator 27 has a frequency that is determined by resistor 29 and capacitor 31, such as 20 kilohertz. The frequency will be substantially constant once installed in its subsea location.

The two outputs on pins 5 of the oscillators 23 and 27 connect to an infrared emitter 33, which is a light emitting diode. Connecting the two outputs in this fashion, known as heterodyne, results in an output that equals only the difference between the frequencies of the oscillators 23, 27. Capacitor 25 and strain gage 21 are sized so that the frequency of the variable oscillator 23 will be the same as the frequency of the reference oscillator 27 when no pressure exists in bore 13 other than normal ambient. When the frequencies are the same, the emitter 33 will not produce any light pulses. If, on the other hand, internal pressure causes strain gage 21 to vary in resistance, the frequency of oscillator 23 will change, with this change resulting in light pulses emitted by emitter 33, the frequency of which is proportional to the pressure being monitored.

Emitter 33 will flash the pulses through a lens 35 to the exterior, which will be sensed by the movable unit 19. Power for the stationary unit 15 comes from a selenium type photocell 37. Photocell 37 is mounted behind a lens 39 for receiving a beam of light from a light source. Photocell 37 will convert the light received into electricity. The electrical power will power the two oscillators 23, 27 of the stationary unit 15. Photocell 37 is connected to the anode of emitter 33. The opposite lead of photocell 37 connects to ground.

The circuitry of the stationary unit 15 also includes a resistor 41 connected between the cathode of emitter 33 and pin 2 of oscillator 27. Similarly, a resistor 43 connects the cathode of emitter 33 to pin 2 of oscillator 23.

A light source for powering stationary unit 15 is carried by movable unit 19. This light source includes a high intensity narrow band width laser 45 which will supply beam of light through a lens 47. The wavelength of laser 45 is preferably about 500 nm. Filters will be incorporated with lens 39 in stationary unit 15 so as to filter light having wavelengths out of a selected range of that provided by laser 45.

The pulses from emitter 33 will pass through a lens 49 and be received by a phototransistor 51. A filter of about 800 nm band width associated with lens 49 filters any light from other sources. Phototransistor 51 detects the pulses. The pulses are amplified by amplifiers 53, 55. Amplifiers 53, 55 are connected conventionally with various resistors and capacitors. The amplified pulses pass to a decoder circuit 57.

Decoder circuit 57 may be of various types. Preferably it is a frequency counter which counts the pulses received within a given time increment to determine the frequency. The output may be transmitted to the surface over a data line or other telemetry method. If recorded in the ROV, the decoder 57 output can be displayed subsequently when the ROV is pulled to the surface. The frequency detected can be correlated through various circuitry to determine the corresponding pressure.

In operation, before the wellhead housing 11 is installed, the stationary unit 15 will be mounted in recess 17. Periodically, an ROV will be lowered into the sea to locate next to the stationary unit 15. Power will be supplied down to the ROV to cause laser 45 to beam light over to photocell 37. Photocell 37 provides power to the stationary unit 15. Oscillators 23, 27 will provide output frequencies on line 5.

If there is no internal pressure in bore 13, other than normal ambient, the output frequencies will be the same. There will be no output on emitter 33. If, on the other hand, pressure has increased in bore 13 over ambient, this will cause a change in the frequency of oscillator 23. The difference in the frequencies between oscillators 23 and 27 will be applied to emitter 33. These pulses will be transmitted as light through lens 35.

The movable unit 19 will receive the light with phototransistor 51. Amplifiers 53, 55 amplify the pulses and pass the signal to a decoder circuit 57. The frequency of the pulses will be determined by decoder circuit 57 and converted to a pressure reading.

The invention has significant advantages. The invention enables pressure to be monitored in the interior of a subsea tubular member without having to drill any holes from the exterior. The pressure is monitored on the exterior, eliminating the need for any equipment to be located in the interior of the tubular member. No permanently mounted power source nor data wires are required. The power is supplied remotely without any physical connection being required. The power and the data transmits by light, avoiding any need for any electrical connections to be made.

While the invention has been shown in only one of its forms, it should be apparent to those skilled in the art that it is not so limited, but is susceptible to various changes without departing from the scope of the invention. For example, a second light emitter could be employed, one for transmitting reference frequency and the other for transmitting the frequency from the variable oscillator. The movable unit could receive both light pulses and compute the pressure based on the difference in frequencies.

I claim:

1. An apparatus for measuring pressure in a subsea tubular member, comprising in combination:
    a stationary unit mounted to the tubular member and a movable unit adapted to be lowered into the sea and placed adjacent the stationary unit when pressure is to be measured, the stationary unit comprising:
    a sensor capable of sensing pressure in the tubular member;
    circuit means connected to sensor for providing an electrical indication correlating with the pressure sensed by the sensor;
    a light emitter connected to the circuit means for emitting light pulses to the movable unit that correlate with the electrical indication;
    a photocell connected to the circuit means and the light emitter for supplying electrical power to the circuit means and light emitter when the photocell receives light from the movable unit;
    the movable unit comprising:
    a light source for supplying a light beam to the photocell; and
    a phototransistor for receiving the light pulses from the light emitter and converting the light pulses into an electrical indication correlating with the light pulses received by the phototransistor to enable the pressure in the tubular member to be determined.

2. The apparatus according to claim wherein the sensor comprises a strain gage that senses stress in the tubular member due to internal pressure.

3. The apparatus according to claim 1 wherein the sensor comprises a strain gage mounted to the exterior of the tubular member that senses stress in the tubular member due to internal pressure.

4. The apparatus according to claim wherein the electrical indication provided by the circuit means to the light emitter is a signal, the frequency of which correlates with the pressure sensed.

5. The apparatus according to claim 1 wherein the light source comprises a laser.

6. An apparatus for measuring pressure in a subsea tubular member, comprising in combination:
    a stationary unit mounted to the exterior of the tubular member and isolated from the interior of the tubular member by a tubular wall of the tubular member;
    a movable unit adapted to be lowered into the sea and placed adjacent the stationary unit when pressure is to be measured:

pressure sensor means in the stationary unit for sensing pressure in the tubular member by sensing stress in the tubular wall of the tubular member and for converting the pressure sensed into an electrical signal;

light emitter means connected to the pressure sensor means for emitting light pulses to the movable unit that correlate with the electrical signal received from the pressure sensor means;

photocell means connected to the pressure sensor means and the light emitter means for supplying electrical power to the pressure sensor means and the light emitter means when the photocell means receives light from the movable unit;

light source means mounted to the movable member for supplying light to the photocell means; and light receiver means mounted to the movable member for receiving the light pulses from the light emitter means and converting the light pulses into an electrical indication to enable the pressure in the tubular member to be determined.

7. The apparatus according to claim 6 wherein the pressure sensor means comprises a strain gage.

8. The apparatus according to claim 6 wherein the light source means comprises a laser.

9. The apparatus according to claim 6 wherein the light receiver means comprises a phototransistor.

10. The apparatus according to claim 6 wherein the light pulses emitted by the light emitter means have a frequency that correlates with the pressure in the tubular member.

11. An apparatus for measuring pressure in a subsea tubular member, comprising in combination:

a stationary unit mounted to the tubular member and a movable unit adapted to be lowered into the sea and placed adjacent the stationary unit when pressure is to be measured, the stationary unit comprising:

a strain gage mounted to the exterior of the tubular member for sensing strain in the tubular member;

a variable oscillator circuit connected to the strain gage for providing an electrical signal with a frequency that varies depending upon the strain sensed by the strain gage;

a reference oscillator circuit that provides an electrical signal with a frequency that is substantially constant, the difference between the frequency of the reference oscillator circuit and the variable oscillator circuit correlating to the pressure in the tubular member;

a light emitter connected to the variable oscillator circuit and the reference oscillator circuit for emitting light pulses to the movable unit that have a frequency that is the difference in frequency between the variable oscillator circuit and the reference oscillator circuit;

a photocell connected to the strain gage, variable oscillator circuit, reference oscillator circuit and the light emitter for supplying electrical power when the photocell receives light from the movable unit;

the movable unit comprising:

a light source for supplying a light beam to the photocell; and a phototransistor for receiving the light pulses from the light emitter and converting the light pulses into an electrical indication to enable the pressure in the tubular member to be determined.

12. The apparatus according to claim 11 further comprising:

means connected with the phototransistor for determining the frequency of the pulses emitted by the light emitter to determine pressure.

13. A method for measuring pressure in a subsea tubular member, comprising in combination:

mounting a stationary unit to the exterior of the tubular member;

lowering a movable unit into the sea adjacent the tubular member;

emitting light from the movable unit to the stationary unit;

converting the light received from the movable unit to electrical power in the stationary unit;

sensing strain in the tubular wall of the tubular member and converting the strain sensed into an electrical signal by using the electrical power;

emitting light pulses from the stationary unit to the movable unit that correlate with the electrical signal by using the electrical power; and receiving the light pulses from the stationary unit and converting the light pulses into an electrical indication to enable the pressure in the tubular member to be determined.

14. The method according to claim 13 wherein the step of converting the strain sensed into an electrical signal comprises:

varying an oscillator frequency in accordance with strain sensed;

comparing the oscillator frequency to a reference frequency; and emitting the light pulses at a frequency proportional to the difference between the oscillator frequency and the reference frequency.

* * * * *